US005356182A

United States Patent [19]

Sanders

[11] Patent Number: 5,356,182
[45] Date of Patent: Oct. 18, 1994

[54] HOSE CONSTRUCTION, COUPLING THEREFOR AND METHODS OF MAKING THE SAME

[75] Inventor: John D. Sanders, Springfield, Mo.

[73] Assignee: Dayco Products, Inc., Dayton, Ohio

[21] Appl. No.: 197,891

[22] Filed: Feb. 17, 1994

Related U.S. Application Data

[63] Continuation of Ser. No. 993,196, Dec. 18, 1992, abandoned.

[51] Int. Cl.$^5$ ............................................ F16L 33/213
[52] U.S. Cl. ................................... 285/258; 285/259; 285/149; 285/251; 29/507; 29/890.144; 29/523
[58] Field of Search ................ 285/258, 256, 259, 251, 285/149; 29/507, 523, 890.144

[56] References Cited

U.S. PATENT DOCUMENTS

| 3,078,109 | 2/1963 | Jackson et al. | 285/251 |
|---|---|---|---|
| 3,246,921 | 4/1966 | Lyon et al. | 285/251 |
| 3,381,981 | 5/1968 | Wilson | 285/149 |
| 3,529,853 | 9/1970 | Triest et al. | 285/149 |
| 4,805,942 | 2/1989 | Goodridge | 285/149 |
| 5,037,143 | 8/1991 | Sanders et al. | 285/259 |
| 5,096,234 | 3/1992 | Oetiker | 285/256 |
| 5,109,600 | 5/1992 | Holden et al. | 285/258 |
| 5,129,686 | 7/1992 | Sanders | 285/258 |

FOREIGN PATENT DOCUMENTS

| 690604 | 7/1964 | Canada | 285/251 |
|---|---|---|---|
| 2372846 | 1/1975 | Fed. Rep. of Germany | 285/251 |

*Primary Examiner*—Eric K. Nicholson
*Attorney, Agent, or Firm*—Joseph V. Tassone

[57] ABSTRACT

A hose construction, coupling therefor and methods of making the same are provided, the hose construction comprising a tubular hose and a coupling secured to one end of the tubular hose, the coupling having an insert disposed in the one end of the tubular hose and being radially outwardly expanded into sealing relation with an inner corrugated hose of the tubular hose, the insert having an outer peripheral surface defined by a plurality of outwardly directed projections with recesses therebetween, the projections of the insert being respectively received in recesses of the inner hose and projections of the inner hose being respectively received in the recesses of the insert whereby the interior of the tubular hose is substantially sealed to the interior of the coupling, the projections of the insert each having a substantially flat outer surface.

10 Claims, 8 Drawing Sheets

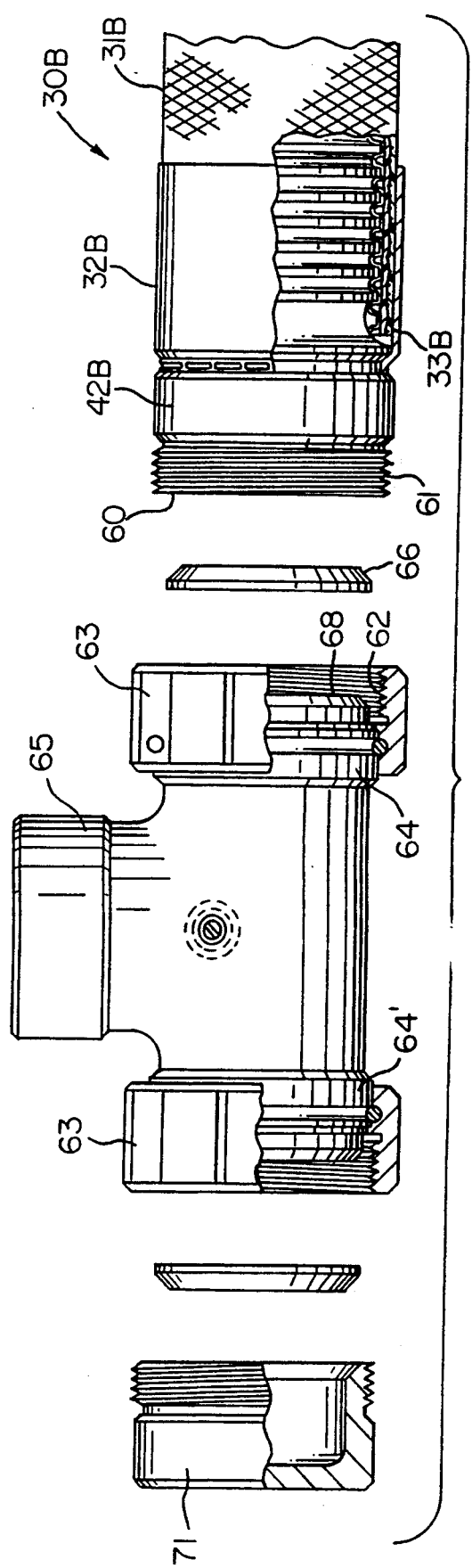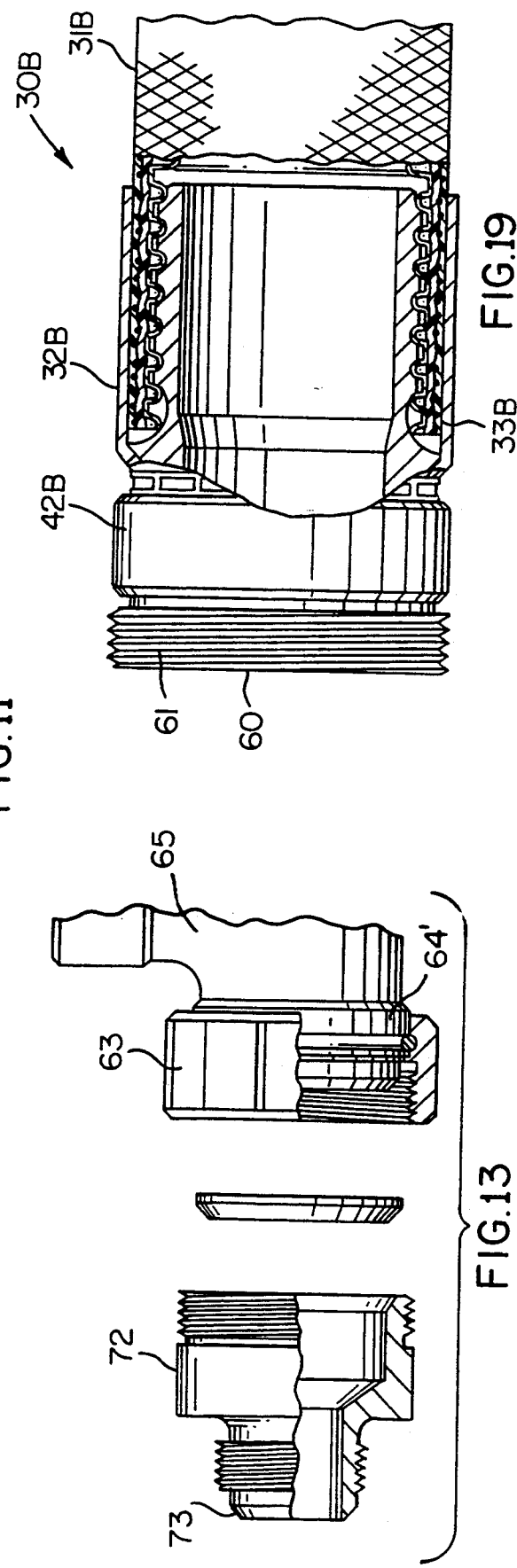

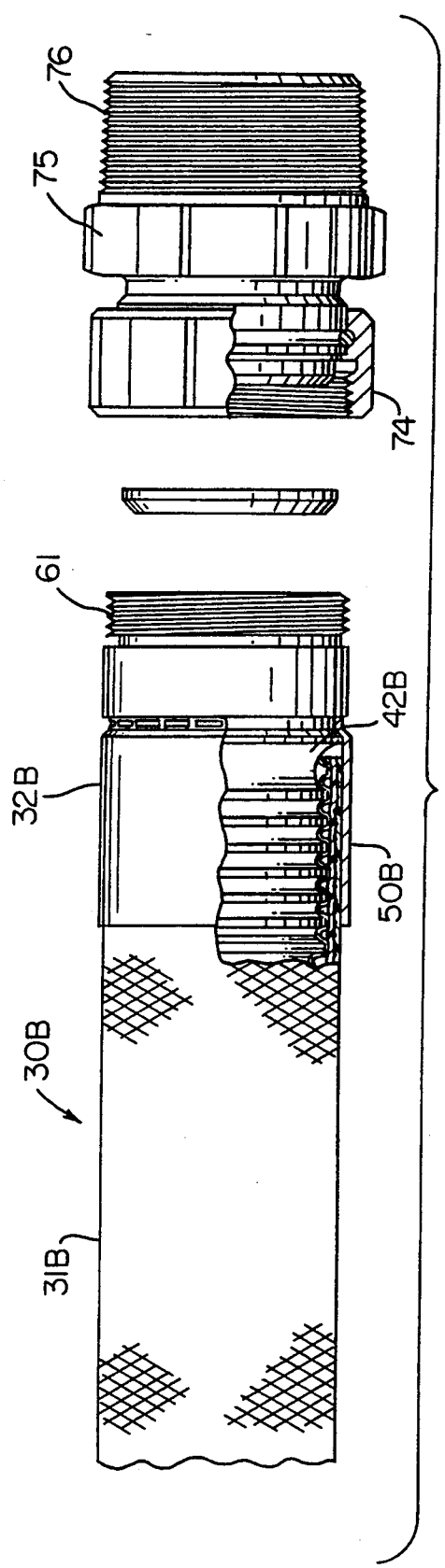
FIG. 12
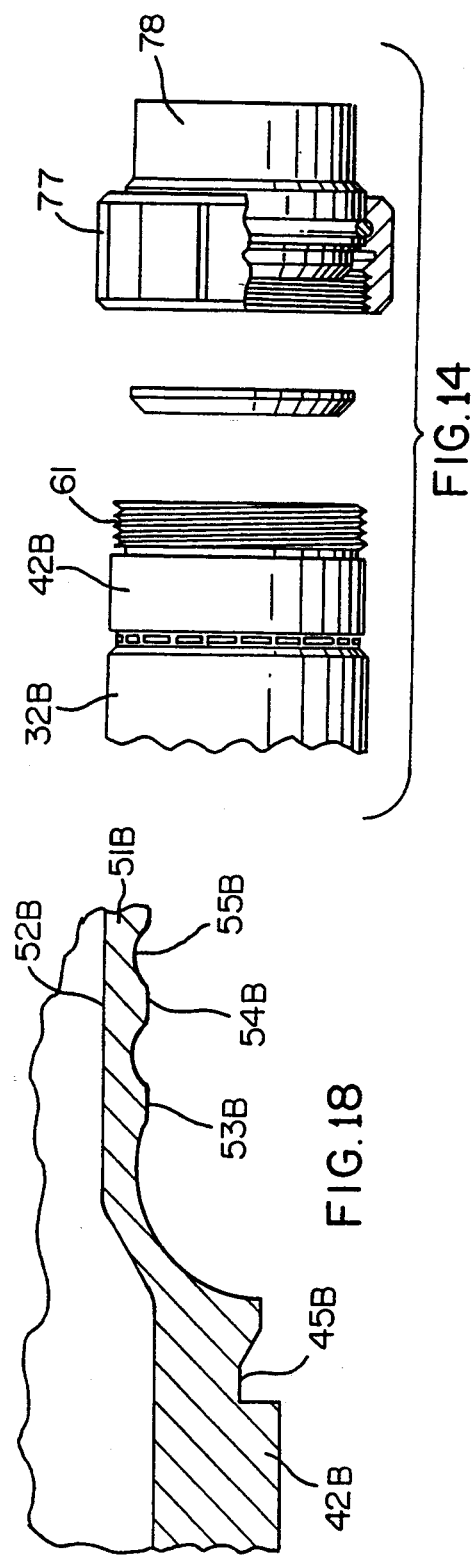
FIG. 14
FIG. 18

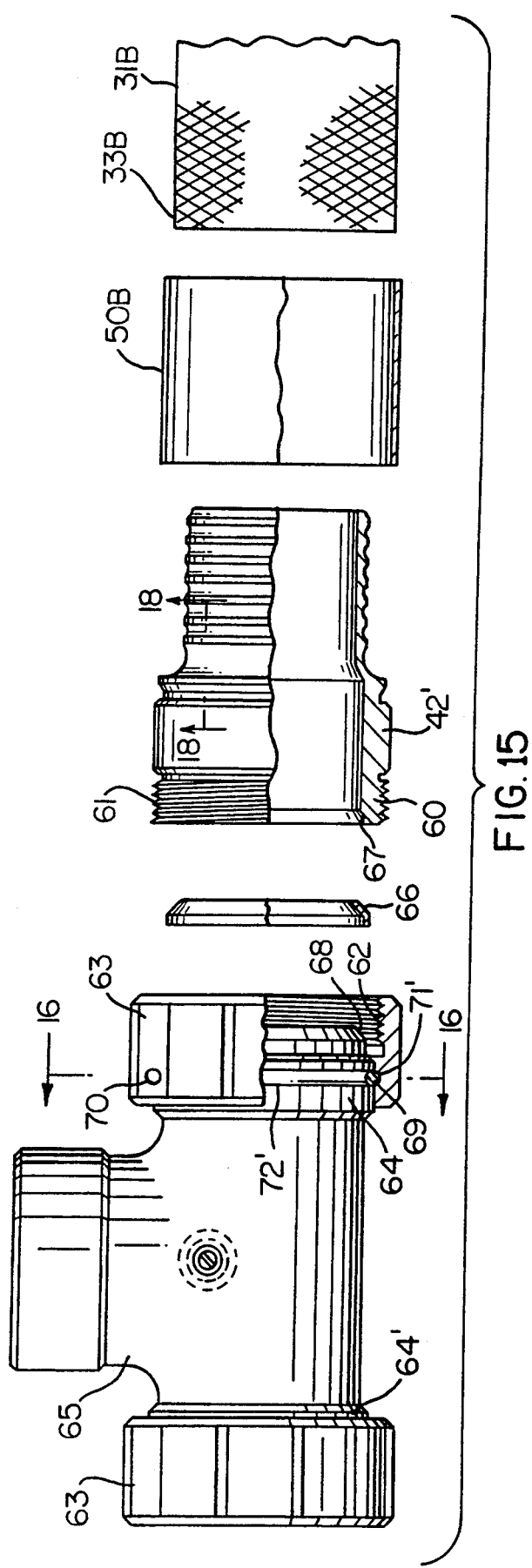
FIG.15
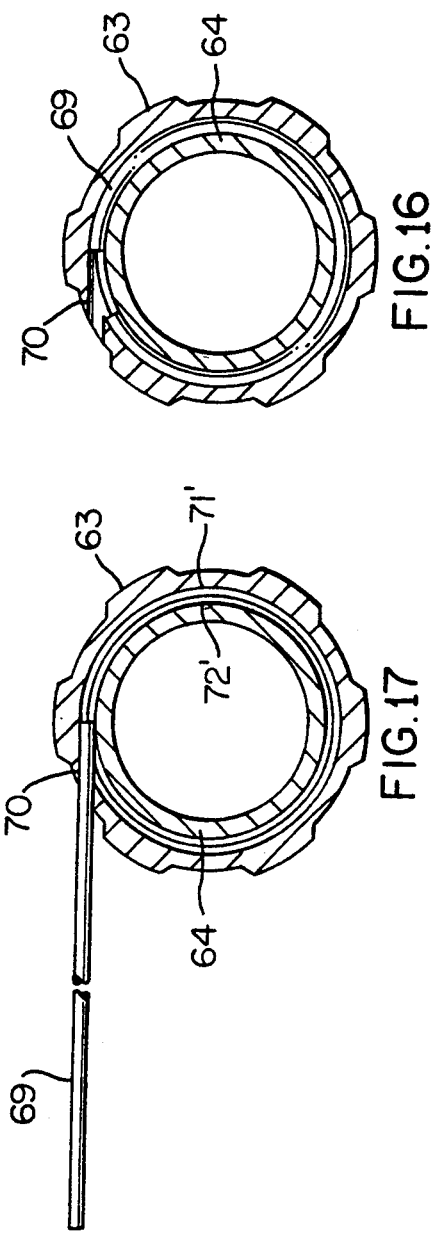
FIG.16
FIG.17

5,356,182

HOSE CONSTRUCTION, COUPLING THEREFOR AND METHODS OF MAKING THE SAME

CROSS REFERENCE TO RELATED APPLICATIONS

This application is a continuation patent application of its copending parent patent applicaton, Ser. No. 993,196, filed Dec. 18, 1992, now abandoned.

BACKGROUND OF THE INVENTION

1. Field of the Invention

This invention relates to a new hose construction and to a new coupling therefor as well as to a new method of making such a hose construction and a new method of making such a coupling.

2. Prior Art Statement

It is known to provide a hose construction comprising a tubular hose having an inner peripheral surface means and an outer peripheral surface means, and a coupling secured to one end of the tubular hose, the inner peripheral surface means of the tubular hose comprising an inner corrugated hose made of polymeric material and having inwardly convex projections with recesses therebetween and extending from the one end of the tubular hose to the other end thereof, the coupling having an insert means disposed in the one end of the tubular hose and being radially outwardly expanded into sealing relation with the inner corrugated hose, the insert means having an outer peripheral surface means defined by a plurality of outwardly directed projections with recesses therebetween, the projections of the insert means being respectively received in the recesses of the inner hose and the projections of the inner hose being respectively received in the recesses of the insert means whereby the interior of the tubular hose is substantially sealed to the interior of the coupling, the projections of the insert means each having a substantially convex outer surface. For example, see the U.S. Pat. No. 5,129,686 to Sanders et al.

SUMMARY OF THE INVENTION

It is one of the features of this invention to provide a new hose construction of the type set forth in the aforementioned U.S. Pat. No. 5,129,686 to Sanders et al, and wherein the insert means of the coupling is uniquely formed.

In particular, it was found according to the teachings of this invention that the insert means for the coupling can be made with projections with each having a substantially flat outer surface rather than the mating concave outer surface as in the aforementioned U.S. Pat. No. 5,129,686 to Sanders et al, and still provide effective sealing with the inner corrugated hose of the tubular hose of the hose construction even though those projections do not extend all the way to the roots of the recesses of the inner corrugated hose of the tubular hose whereby the insert means can be made of metallic material and have a larger inside diameter so as to be less likely to crack when radially outwardly expanded into sealing relation with the inner corrugated hose of the tubular hose construction.

For example, one embodiment of this invention provides a hose construction comprising a tubular hose having an inner peripheral surface means and an outer peripheral means, and a coupling secured to one end of said tubular hose, the inner peripheral surface means of said tubular hose comprising an inner corrugated hose made of polymeric material and having inwardly convex projections with recesses therebetween and extending from the one end of the tubular hose to the other end thereof, the coupling having an insert means disposed in the one end of the tubular hose and being radially outwardly expanded into sealing relation with the inner corrugated hose, the insert means having an outer peripheral surface means defined by a plurality of outwardly directed projections with recesses therebetween, the projections of the insert means being respectively received in the recesses of the inner hose and the projections of the inner hose being respectively received in the recesses of the insert means whereby the interior of the tubular hose is substantially sealed to the interiof of the coupling, the projections of the insert means each having a substantially flat outer surface.

Accordingly, it is an object of this invention to provide a new hose construction having one or more of the novel features of this invention as set forth above or hereinafter shown or described.

Another object of this invention is to provide a new method of making such a hose construction, the method of this invention having one or more of the novel features of this invention as set forth above or hereinafter shown or described.

Another object of this invention is to provide a new coupling for such a hose construction, the coupling of this invention having one or more of the novel features of this invention as set forth above or hereinafrer shown or described.

Another object of this invention is to provide a new method of making such a coupling, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 11 is an exploded fragmentary view illustrating another hose construction of this invention and how the same is adapted to be coupled to a T-shaped connector that is adapted to have the other branch thereof closed off by an end cap means, FIG. 11 being partially in cross section.

FIG. 12 is an exploded fragmentary view illustrating the other end of the hose construction of FIG. 11 and being adapted to be coupled to an adaptor, FIG. 12 being partially in cross section.

FIG. 13 is an exploded fragmentary view similar to FIG. 11 and illustrates how the one branch of the T-shaped connector is adapted to be interconnected to an adaptor rather than to an end cap as in FIG. 11, FIG. 13 being partially in cross section.

FIG. 14 is an exploded fragmentary view similar to FIG. 12 and illustrates how the end of the hose construction is adapted to be coupled to an end cap means rather than to an adaptor as in FIG. 12, FIG. 14 being partially in cross section.

FIG. 15 is an exploded fragmentary view illustrating the T-connector of FIG. 11 and the exploded parts of the end of the hose construction before the coupling is completed and before the end of the hose has been telescoped within the coupling, FIG. 15 being partially in cross section.

FIG. 16 is a cross-sectional view of the T-shaped connector of FIG. 15 and is taken in the direction of the arrows 16—16 of FIG. 15.

FIG. 17 is a view similar to FIG. 16 and illustrates how the rotatable coupling of the T-connector is wired thereon.

FIG. 18 is an enlarged fragmentary cross-sectional view of a portion of the coupling part illustrated in FIG. 15 and is taken generally in the direction of the arrows 18—18 of FIG. 15.

FIG. 19 is an enlarged fragmentary cross-sectional view of the end of the hose construction illustrated in FIG. 11.

DESCRIPTION OF THE PREFERRED EMBODIMENTS

Figure 1:
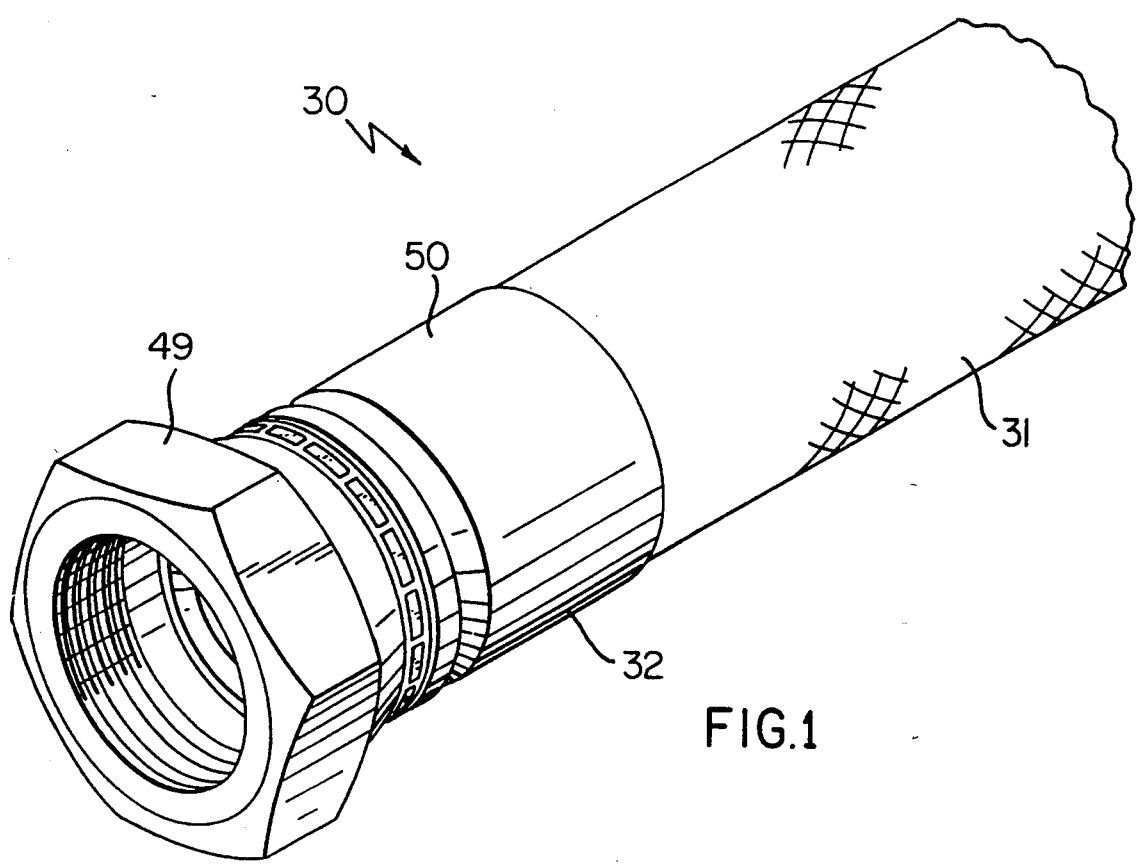
FIG. 1 is a fragmentary perspective view of the new hose construction of this invention.
Figure 2:
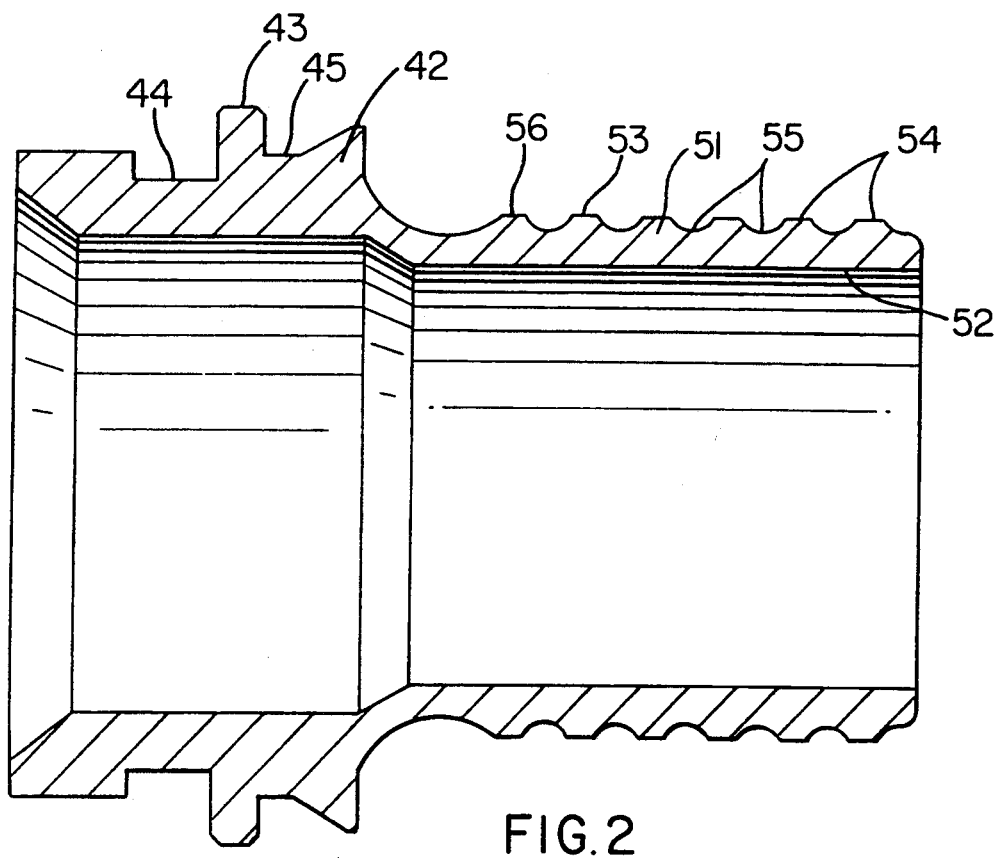
FIG. 2 is an enlarged cross-sectional view of a part of the new coupling of this invention that is utilized to form the hose construction of FIG. 1.
Figure 3:
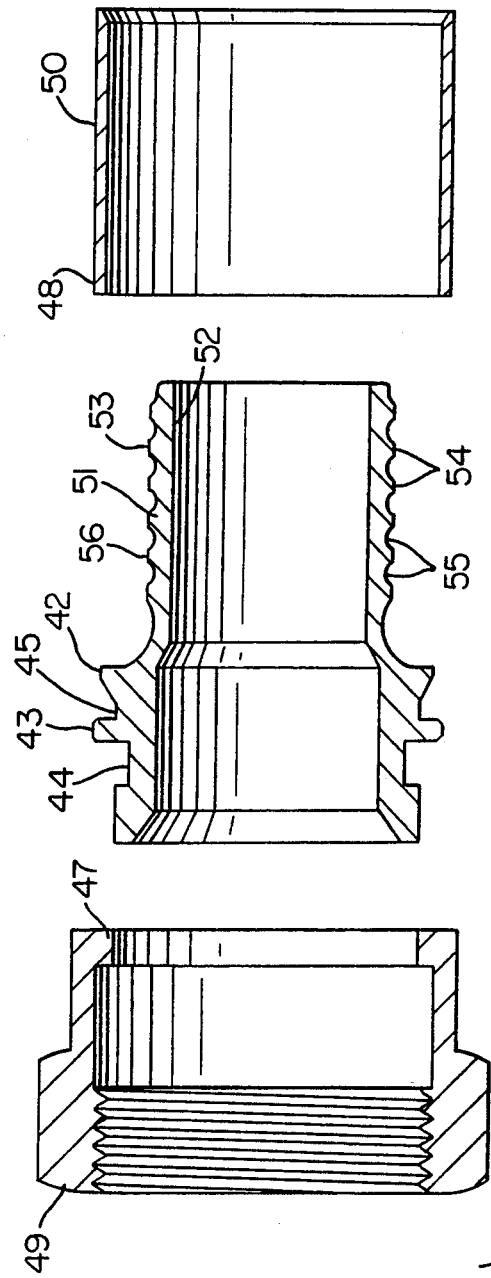
FIG. 3 is an exploded cross-sectional view illustrating the three parts of the new coupling of this invention utilized to form the hose construction of FIG. 1.

While the various features of this invention are hereinafter illustrated and described as being particularly adapted to provide a hose construction for conveying gasoline and like volatile liquids therethrough, it is to be understood that the various features of this invention can be utilized singly or in various combinations thereof to provide a hose construction for conveying other fluids therethrough for other types of apparatus as desired.

Therefore, this invention is not to be limited to only the embodiments illustrated in the drawings because the drawings are merely utilized to illustrate one of the wide variety of uses of this invention.

Referring now to FIG. 1, the new hose construction of this invention is generally indicated by the reference numeral 30 and comprises a tubular hose 31 and a coupling 32 secured to one end 33, FIG. 7, of the hose 31 in a manner hereinafter set forth. Of course, a like coupling 32 or any other suitable structure can be secured to the other end (not shown) of the hose 31, if desired.

As previously set forth, one of the features of this invention is to provide a uniquely formed structure on an insert means of the coupling 32 so as to uniquely interconnect the coupling 32 of this invention to the hose 31 and still provide for a fluid sealed relation between the interiors thereof in substantially the same manner as set forth in the aforementioned U.S. Pat. No. 5,129,686 to Sanders et al, whereby this U.S. patent is being incorporated into this disclosure by this reference thereto.

Such unique means for providing such sealed relation is necessitated by the unique construction of the hose 31 which is fully disclosed and claimed in the U.S. Pat. No. 5,089,074 to Winters et al, whereby this U.S. patent is also being incorporated into this disclosure by this reference thereto.

Therefore, only the details of the hose 31 and the coupling 32 that are believed to be necessary to understand the features of this invention in forming the hose construction 30 of this invention will now be set forth.

Figure 6:
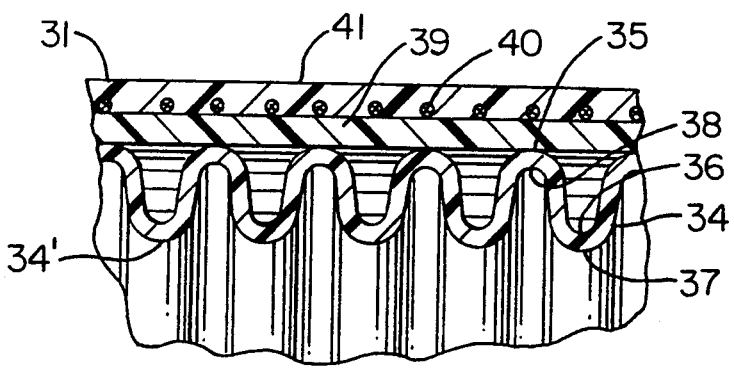
FIG. 6 is an enlarged fragmentary cross-sectional view of the tubular hose of the hose construction of FIG. 1.

As illustrated in FIG. 6 the hose 31 comprises an inner corrugated hose 34 formed of any suitable polymeric material and having a plurality of outwardly convex projections 35 with concave recesses 36 therebetween and extending from one end of the hose 31 to the other end thereof, a tube 39 of any suitable polymeric material and extending in a generally straight line manner from projection 35 to projection 35 as illustrated in FIG. 6, an outer sleeve 40 of any suitable reinforcing material disposed in telescoped relation on the tube 39, and an outer layer 41 of any suitable polymeric material that will provide a protection for the sleeve 40 of reinforcing material and also to tend to prevent any liquid that is conveyed through the flexible hose 31 from permeating to the exterior thereof, such as gasoline and the like.

The inner corrugated hose 34 has a plurality of inwardly convex projections 37 with concave recesses 38 therebetween, the inner projections 37 and recesses 38 defining the interior 34' of the hose 31.

Figure 5:
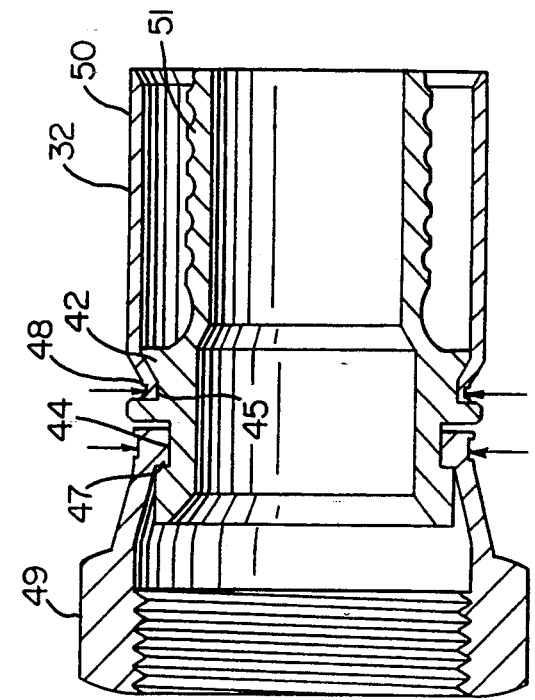
FIG. 5 is a view similar to FIG. 4 and illustrates how the parts of FIG. 4 are secured together.
Figure 4:
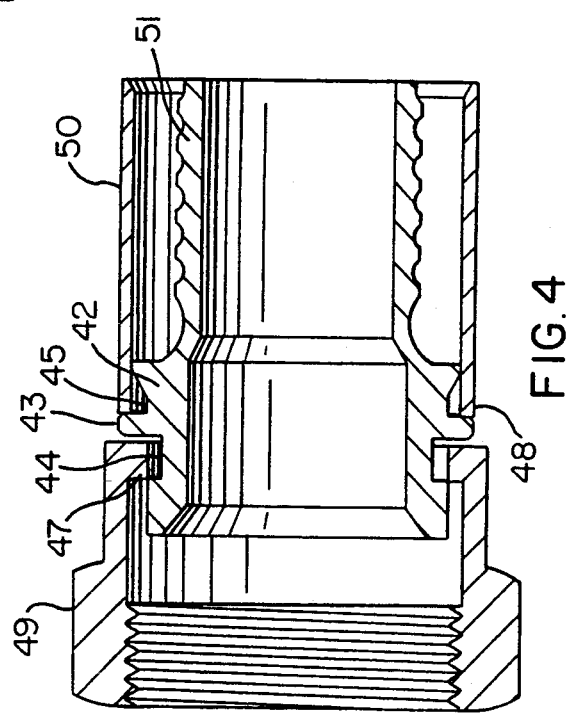
FIG. 4 is a view similar to FIG. 3 and illustrating the parts of FIG. 3 in their assembled relation before the parts are secured together.

The coupling 32 of this invention for sealing to the inner peripheral surface means 34' of the hose 31 is formed of any suitable metallic material and comprises a tubular body member 42 having a portion 43 disposed intermediate two annular recesses 44 and 45 thereof and respectively into which ends 47 and 48 of a rotatable nut 49 and an outer sleeve 50 are radially inwardly deformed in the manner illustrated in FIG. 5, the nut 49 being rotatable relative to the body member 42 while the outer sleeve 50 is interconnected to the body member 42 in substantially a non-rotatable manner therewith.

Figure 7:
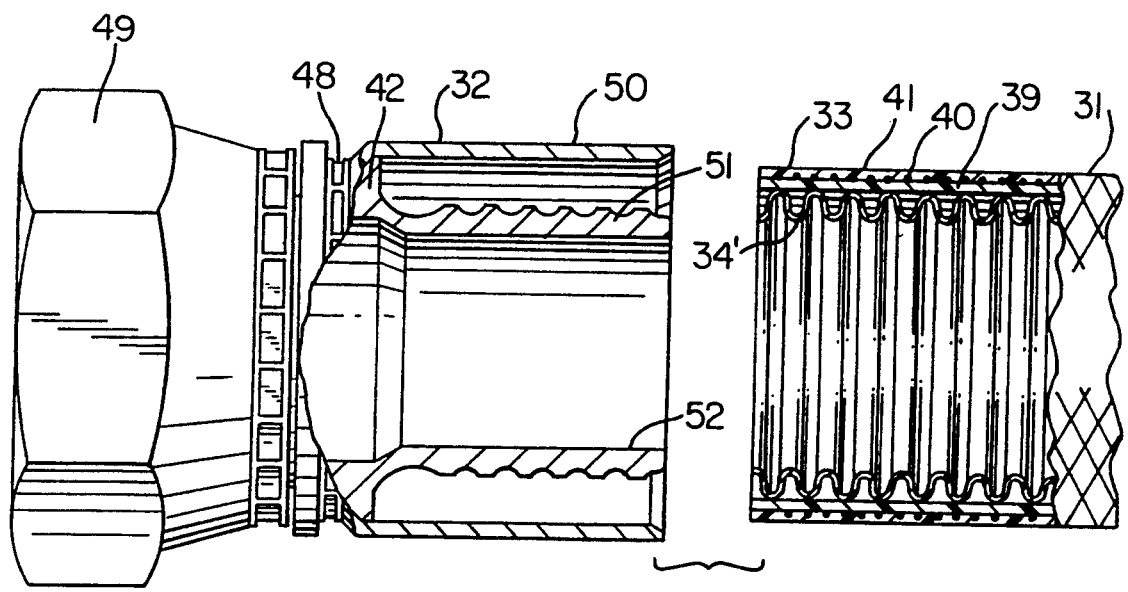
FIG. 7 is an exploded view of the coupling and hose of the hose construction of FIG. 1 before the same are telescoped together, FIG. 7 being partially in cross section.
Figure 8:
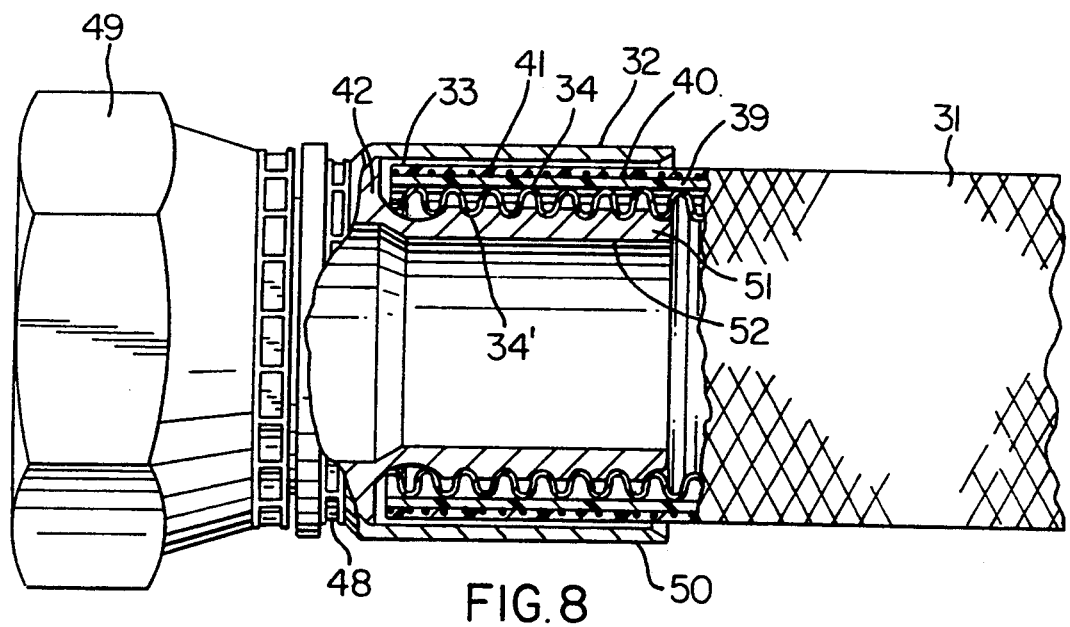
FIG. 8 is a view similar to FIG. 7 and illustrates the coupling and hose telescoped together before the coupling is secured to the end of the hose.
Figure 9:
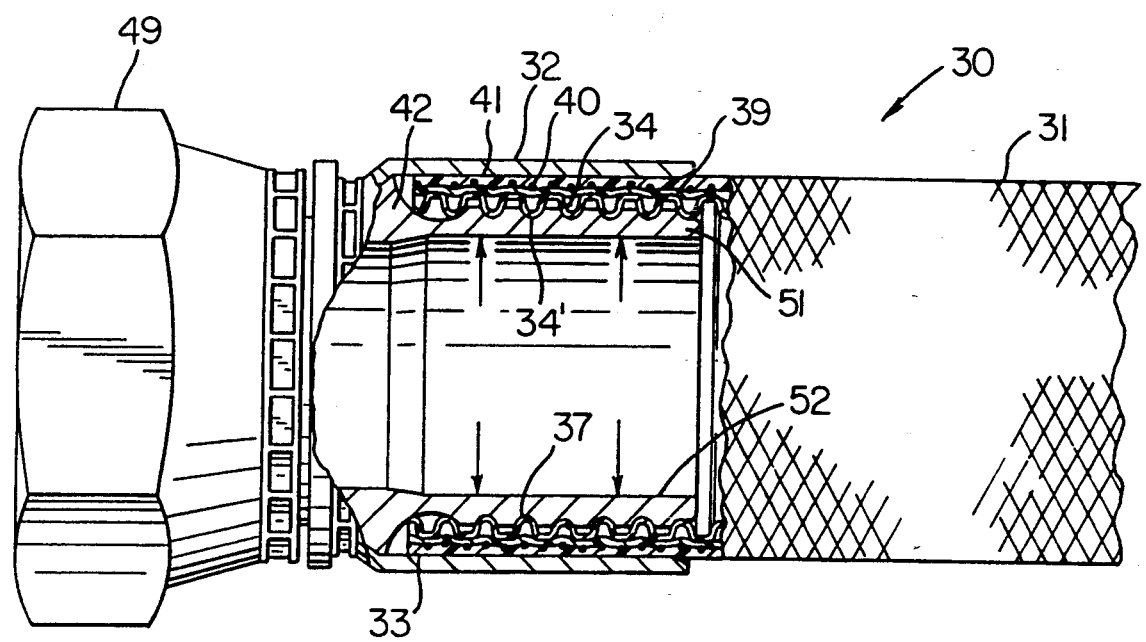
FIG. 9 is a view similar to FIG. 8 and illustrates how the coupling is secured to the end of the hose.

The body member 42 of the coupling 32 has a sleeve-like insert means 51 provided with an internal peripheral surface means 52 and an outer peripheral surface means 53 and is adapted to be telescoped within the end 33 of the hose 31 in the manner illustrated in FIGS. 7 and 8 and then be radially outwardly expanded in the manner indicated by the arrows in FIG. 9 to not only interconnect the coupling 32 to the end 33 of the hose 31, but to also seal the internal peripheral surface 52 of the coupling 32 to the internal peripheral surface means 34' of the hose 31 so as to prevent fluid leakage therebetween as liquid is conveyed through the hose construction 30 for the reasons fully set forth in the aforementioned U.S. Pat. No. 5,129,686 to Sanders et al.

The body member 42 of the coupling 32 has the internal peripheral surface means 52 thereof substantially smooth throughout the entire length thereof so as to define a cylindrical configuration that will not cause the outer peripheral surface means 53 of the insert means 51 to flatten when a suitable expanding tool is engaged against the surface means 52 in a manner well known in the art. However, the outer peripheral surface means 53 of the insert 51 is defined by a plurality of outwardly directed projections 54 with concave recesses 55 therebetween so that when the same is inserted in the end 33 of the hose 31, the inward projections 37 of the hose 31 will be received in the recesses 55 while the projections 54 of the insert means 51 will be received in the recesses 38 of the inner hose 34 of the hose 31.

It was found according to the teachings of this invention that when forming the outer projections on the insert means of the coupling to be convex in the manner set forth in FIGS. 16–18 of the aforementioned U.S. Pat. No. 5,129,686 to Sanders et al, the upper third of such crests did not contribute to the sealing effect with the hose 31 as there was no contact with the roots of the valleys 38 of the hose 31 and therefore this additional height of the crests or projections on the insert means was not needed for sealing.

Therefore, it was further found according to the teachings of this invention that the projections 54 of the insert means 51 could be cut off or truncated in order to define flat outer surfaces 56 thereof. This permitted the outside diameter of the insert means 51 to be the same outside diameter as the prior known insert means where the outside diameter extended all the way to the apexes of the rounded crests thereof whereas with the insert means 51 of this invention, the outside diameter would extend to the flat surfaces 56 and this permitted the inside diameter that defines the internal peripheral surface 52 thereof to be larger than in the prior known coupling structure. Accordingly this reduces the amount of expansion of the insert means 51 radially outwardly during the coupling operation with the end 33 of the hose 31 while maintaining positive sealing with the internal peripheral surface means 34' of the hose 31 and this, in turn, reduces cost, reduces assembly time and reduces possibilities of cracking of the insert means 51.

Figure 10:
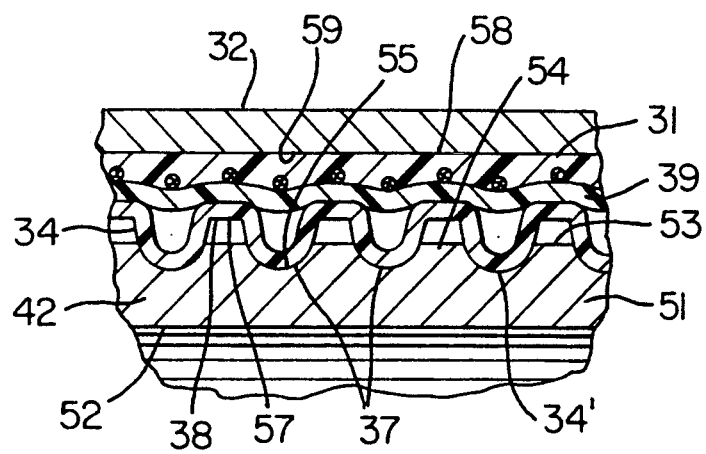
FIG. 10 is an enlarged fragmentary cross-sectional view of the coupling and hose in the secured relation of FIG. 9.

Therefore, it can readily be seen in FIG. 10 of applicant's drawings that full sealing of the external peripheral surface means 53 of insert means 51 is provided with the internal peripheral surface means 34' of the hose 31 even though the projections 54 of the insert means 51 do not reach the roots 57 of the valleys or recesses 38 of the hose 31 during the radially outward expansion of the insert means 51 that also places an outer peripheral surface 58 of the hose 31 into engagement with an internal peripheral surface 59 of the sleeve 50.

While any suitable dimensions can be provided for the insert means 51 of this invention, in one working embodiment thereof that was utilized for coupling to a hose 31 that had the same dimensions as set forth in the one working embodiment thereof in the aforementioned U. S. Pat. No. 5,129,686 to Sanders et al, wherein the inside diameter of the hose 31 is approximately 1.500 of an inch with the distance between the apexes of the projections 37 being approximately 0.246 of an inch, the insert means 51 of this invention before the radially outward expansion thereof has an inside diameter of approximately 1.326 to 1.336 inches and an outside diameter of approximately 1.520 to 1.53 inches with the concave recesses 55 being defined by a radius of approximately 0.080 to 0.090 of an inch so that the depth of the recesses 55 is approximately 0.041 of an inch. Thus, it can be seen that in such one working embodiment of the insert means 51 of this invention the projections 54 of the insert means 51 each has a transverse cross-sectional length that is less than the transverse cross-sectional length of each of the recesses 55.

Figure 20:
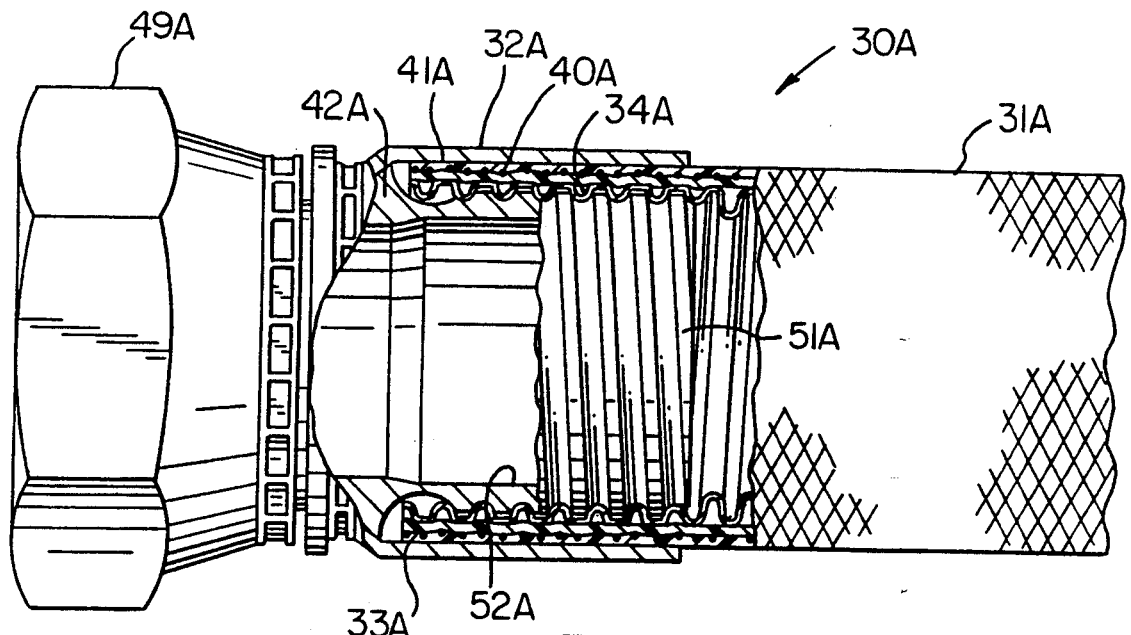
FIG. 20 is a view similar to FIG. 8 and illustrates another hose construction of this invention.

While the projections and recesses of the hose 31 and the insert means 51 have been previously illustrated and described as each being annular, it is to be understood that each could be disposed in a helical path as fully set forth in the aforementioned U.S. Pat. No. 5,129,686 to Sanders et al, and as illustrated in FIG. 20 wherein another hose construction of this invention is generally indicated by the reference numeral 31A and parts thereof that are similar to the parts of the hose construction 30 previously described are indicated by like reference numerals followed by the reference letter "A".

Another hose construction of this invention is generally indicated by the reference numeral 30B in FIGS. 11–19 and parts thereof that are similar to the parts of the hose construction 30 previously described are indicated by like reference numerals followed by the reference letter "B".

It can be seen that the coupling 32B of FIGS. 11–19 is substantially identical to the coupling 32 of FIGS. 1–10 except that an outer end 60 thereof does not have the rotatable nut 49 thereon and the same is provided with external threads 61 which are adapted to couple into internal threads 62 of a rotatable sleeve 63 that is rotatably mounted on a branch 64 of a T-connector 65 which has a like sleeve 63 mounted on the opposite branch 64' thereof as illustrated in FIGS. 11 and 15.

In addition, a metallic annular beveled sealing member 66 is adapted to seal an inwardly beveled surface 67 of the body member 42B to an outer beveled surface 68 of the branch 64 of the T-connector 65 all in a manner well known in the art.

As is also well known in the art, the sleeves 63 are adapted to be rotatably mounted to the branches 64 and 64' of the T-connector 65 by a wire means 69 fed through an opening 70 in the respective sleeve 63 and received in cooperating grooves 71' and 72' formed respectively in the internal surface means of the sleeve 63 and internal surface means of the branch 64 as illustrated in FIGS. 16 and 17.

The sleeves 63 of the T-connector 65 can be utilized to couple to hose constructions 30B of this invention at each branch 64 and 64' thereof or one of the sleeves 63 can be utilized to interconnect to an end cap means 71 as illustrated in FIG. 11 or to an adaptor means 72 as illustrated in FIG. 13 wherein an externally threaded outlet projection 73 thereof can interconnect to a downed size tubular structure as desired.

Similarly, the other end of the hose construction 30B of this invention as illustrated in FIG. 12 can be interconnected to a sleeve 74 on an adaptor 75 that has an enlarged externally threaded projection 76 for coupling to larger tubular means as desired or can be coupled to a sleeve 77 of an end cap means 78 as illustrated in FIG. 14.

Figure 21:
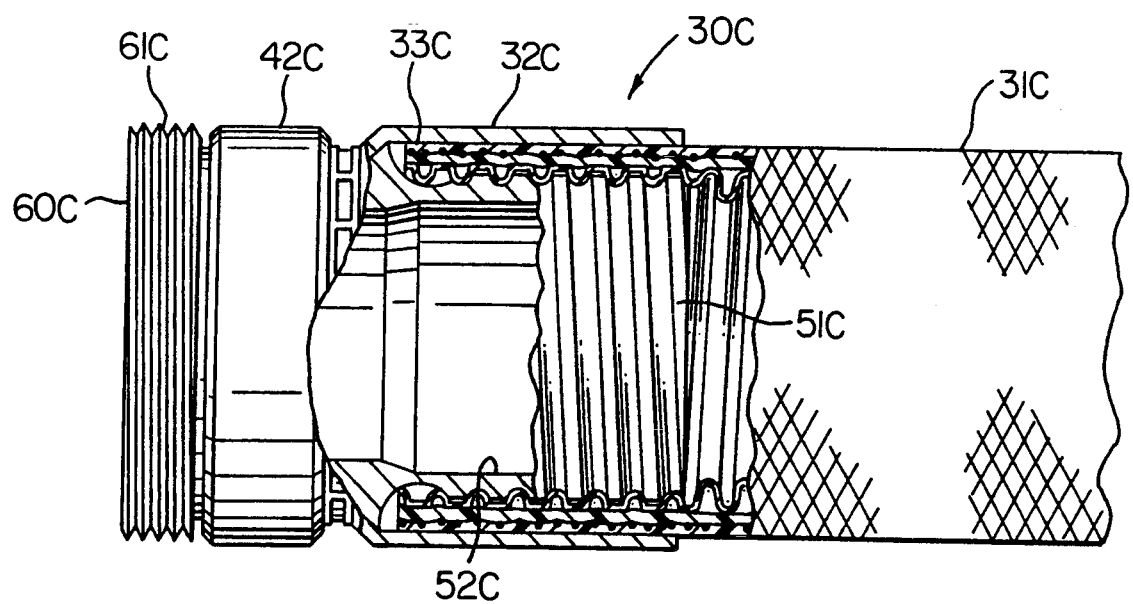
FIG. 21 is a view similar to FIG. 19 and illustrates another hose construction of this invention.

Thus, it can be seen that the hose construction 30B of this invention is substantially identical to the hose construction 30 previously set forth and while the same has annular projections and recesses not only on the insert means 42B thereof but also on the hose 31B thereof, the same could be all formed helical in the manner fully illustrated in FIG. 21 wherein another hose construction of this invention is generally indicated by the reference numeral 30C and parts thereof that are similar to the parts of the hose construction 30B previously described are indicated by like reference numerals followed by the reference letter "C".

Therefore, it can be seen that this invention not only provides a new hose construction and a new method of making such a hose construction, but also this invention provides a new coupling and a new method of making such a coupling.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a hose construction comprising a tubular hose having an inner peripheral surface means and an outer peripheral surface means, and a coupling secured to one end of said tubular hose, said inner peripheral surface means of said tubular hose comprising an inner corrugated hose made of polymeric material and having inwardly convex projections with recesses therebetween and extending from said one end of said tubular hose to the other end thereof, said coupling having an insert means disposed in said one end of said tubular hose and being radially outwardly expanded into sealing relation with said inner corrugated hose, said insert means having an outer peripheral surface means defined by a plurality of outwardly directed projections with recess therebetween, said projections of said insert means being respectively received in said recesses of said inner hose and said projections of said inner hose being respectively received in said recesses of said insert means whereby the interior of said tubular hose is substantially sealed to the interior of said coupling, said convex projections of said hose respectively having apexes that defined an inside diameter of said hose of approximately 1.500 inches and a pitch of said convex projections of approximately 0.246 of an inch before said insert means was radially outwardly expanded, said insert means comprising a tubular metallic sleeve that is formed to define said outer peripheral surface means thereof, the improvement wherein said projections of said sleeve each has a substantially flat outer surface and defined an outside diameter of said sleeve of approximately 1.515 inches before said sleeve was radially outwardly expanded, said sleeve having defined an inside diameter thereof of approximately 1.331 of an inch before said sleeve was radially outwardly expanded, said recesses of said sleeve each having had a depth of approximately 0.041 of an inch before said sleeve was radially outwardly expanded.

2. A hose construction as set forth in claim 1 wherein said recesses of said sleeve each has a substantially concave outer surface.

3. A hose construction as set forth in claim 1 wherein said projections of said sleeve each has a transverse cross-sectional configuration of a certain length and said recesses of said sleeve each has a transverse cross-sectional configuration of a predetermined length that is different than said certain length.

4. A hose construction as set forth in claim 1 wherein said projections of said inner hose and said sleeve are respectively annular and are respectively disposed substantially transverse to the longitudinal axis of said hose construction.

5. A hose construction as set forth in claim 1 wherein said projections of said inner hose and said sleeve respectively extend in a helical path about the longitudinal axis of said hose construction.

6. A hose construction as set forth in claim 1 wherein said recesses of said sleeve each had a substantially concave outer surface defined by a radius of approximately 0.085 of an inch before said sleeve was radially outwardly expanded.

7. A hose construction as set forth in claim 1 wherein said tubular hose has an outer peripheral surface means, said coupling having an outer metallic tubular member telescopically disposed over said tubular hose and being engaged by said outer peripheral surface means of said tubular hose.

8. A hose construction as set forth in claim 1 wherein said coupling has a rotatable nut means for fluidly coupling said hose construction to other structure.

9. A hose construction as set forth in claim 1 wherein said coupling has an externally threaded end for coupling to other structure.

10. A hose construction as set forth in claim 9 wherein said sleeve and said externally threaded end comprise a one-piece member.

* * * * *